United States Patent
Lei et al.

(10) Patent No.: US 9,608,737 B2
(45) Date of Patent: Mar. 28, 2017

(54) CIRCUIT FOR REALIZING PASSIVATION OF INTELLIGENT OPTICAL DISTRIBUTION INTERFACE DISC IN MACHINE DISC ENABLE MANNER

(75) Inventors: Fei Lei, Hubei (CN); Qiufu Chen, Hubei (CN); Yang Wang, Hubei (CN); Man Yi, Hubei (CN); Feng Wang, Hubei (CN); Yun Rong, Hubei (CN); Xiongbao Luo, Hubei (CN)

(73) Assignee: FIBERHOME TELECOMMUNICATION TECHNOLOGIES CO., LTD., Wuhan, Hubei (CN)

( * ) Notice: Subject to any disclaimer, the term of this patent is extended or adjusted under 35 U.S.C. 154(b) by 483 days.

(21) Appl. No.: 14/124,705

(22) PCT Filed: Aug. 10, 2012

(86) PCT No.: PCT/CN2012/079945
§ 371 (c)(1),
(2), (4) Date: Dec. 6, 2013

(87) PCT Pub. No.: WO2013/143251
PCT Pub. Date: Oct. 3, 2013

(65) Prior Publication Data
US 2014/0112665 A1    Apr. 24, 2014

(30) Foreign Application Priority Data
Mar. 31, 2012 (CN) .......................... 2012 1 0090973

(51) Int. Cl.
*H04B 10/80* (2013.01)
*G02B 6/42* (2006.01)
*G02B 6/255* (2006.01)

(52) U.S. Cl.
CPC ......... *H04B 10/801* (2013.01); *G02B 6/2553* (2013.01); *G02B 6/4292* (2013.01)

(58) Field of Classification Search
None
See application file for complete search history.

(56) References Cited

U.S. PATENT DOCUMENTS

| | | | |
|---|---|---|---|
| 2005/0215119 A1* | 9/2005 | Kaneko | G06K 7/10178 439/607.01 |
| 2008/0031620 A1* | 2/2008 | Hudgins | H04B 10/075 398/9 |

(Continued)

OTHER PUBLICATIONS http://www.businessdictionary.com/definition/matrix-management.html.*

*Primary Examiner* — David Payne
*Assistant Examiner* — Casey Kretzer
(74) *Attorney, Agent, or Firm* — Kile Park Reed & Houtteman LLC

(57) ABSTRACT

Disclosed is a circuit for realizing passivation of an intelligent optical distribution interface disc in a machine disc enable manner, which relates to the field of optical communications. In the present invention, a distribution port is separated from distribution management, all management circuits on a distribution interface disc are moved out, and all control and management functions are achieved on a distribution management disc, to enable passivation of a distribution interface disc circuit, i.e. any active electronic devices such as integrated circuits, triodes, etc. which are easily damaged by static electricity and affected by fouling are not placed on the distribution interface disc any longer, and power lines are not introduced in the distribution interface disc. Using the present invention, no matter whether in a fusion-distribution integration or fusion-distribution separation design, during onsite construction, a dis- (Continued)

tribution disc has both strong anti-static capability and fouling-resistant capability. When the fusion-distribution integration design is used, the device cost can be reduced, the device production process can be reduced, and the device performance and the distribution density can be increased. When the fusion-distribution separation design is used, even an optical fiber fusion splice point on the distribution disc generates failure, over-high requirements may not be put forward for maintenance and construction.

5 Claims, 17 Drawing Sheets

(56) References Cited

U.S. PATENT DOCUMENTS

| | | | | |
|---|---|---|---|---|
| 2008/0262629 A1* | 10/2008 | Fonte | ............ | A61F 2/30942 623/23.15 |
| 2012/0128045 A1* | 5/2012 | Ling | ............ | H04L 12/2801 375/222 |
| 2012/0291084 A1* | 11/2012 | Rakib | ............ | H04N 7/10 725/111 |

* cited by examiner

CIRCUIT FOR REALIZING PASSIVATION OF INTELLIGENT OPTICAL DISTRIBUTION INTERFACE DISC IN MACHINE DISC ENABLE MANNER

BACKGROUND OF THE INVENTION

Field of Invention

The present invention relates to the field of optical communications, and in particular, to a circuit for realizing passivation of an intelligent optical distribution interface disc in a machine disc enable manner.

Related Art

Pushed by FTTH (Fiber-To-The-Home, fiber-to-the-home) construction, an ODN (Optical Distribution Network, optical distribution network) embraces explosive growth. Because the FTTH mainly adopts a PON (Passive Optical Network, passive optical network) technology, which splits an OLT (Optical Line Terminal, optical line terminal) to dozens or hundreds of ONUs (Optical Network Unit, optical network unit), therefore a user end of the ODN network generates a large number of optical fiber lines, and distribution scheduling, maintenance, and management need to be performed.

Earlier optical cable lines are basically all point-to-point lines and the management is relatively easy. However, the ODN network serving the FTTH is a point-to-multipoint line, and continues to use a current character label only artificially identifiable to perform optical fiber distribution management, and thereby maintenance workload and management difficulty thereof are greatly increased. In addition, the PON technology has a one-to-many optical network feature. Therefore, on an optical branch network, a user may freely access to any branch to perform normal signal transmission, without being perceived by a network administrator. This feature makes manageability of the ODN greatly decrease. A loophole of artificial management will cause an error of inconsistency between network data and an actual network status. This bearer brings a lot of difficulties to subsequent network maintenance work.

To solve this problem, an intelligent ODN optical distribution management technology appears. This technology, based on an electronic label, gives each optical fiber moveable connector an ID chip with a globally unique code, manages optical fiber distribution in an electronic automatic collection manner, so as to eliminate the error that possibly occurs during the artificial management, and uses a computer network technology to provide guidance on optical distribution network maintenance. Thereby, a port needing to be operated may be highlighted among densely arranged distribution frame adapter arrays, to reduce labor strength.

To read electronic label information of the moveable connector inserted into the optical fiber adapter, on an optical distribution disc (or board or card, which is an independent structural unit body, and hereinafter is uniformly called the disc with differences among the disc, board, and card being omitted,), an appropriate optical port is needed, and additionally corresponding port drive and read-write circuits are also needed, so as to receive a signal sent by a management disc, drive the port of this disc to perform an relevant operation, and report insertion information of the optical fiber moveable connector to the management disc.

The drive and read-write circuits all include a certain number of digital integrated circuit chips, and these circuits all have certain static electricity protection limitations and anti-short circuit capability limitations.

To simplify designs of an ODF (Optical Distribution Frame, optical distribution frame) and an optical fiber cross connecting cabinet, in most cases, the designs of a fiber fusion function and a distribution function are required to be realized on one machine disc, that is, a fusion-distribution integration. In this case, during onsite construction of the ODN network, the optical distribution disc needs to be taken out for optical fiber fusion splice. Thereby, a machine disc circuit is exposed to a natural space environment, may not be protected by a device cabinet, and is easily encroached by static electricity.

Additionally, because the optical fiber cross connecting cabinets mostly work in an open-air environment, and the circuit will be contaminated by muddy water during construction on a rainy day, reducing insulation performance of the circuit, thereby the functions and features of the circuit are affected, and even a component such as a chip is damaged due to a short circuit. Because FTTH projects are widely carried out, onsite environments are in great variety, working levels of construction persons are different, and the foregoing cases are extremely difficult to be avoided, therefore, how to improve anti-static capability and fouling-resistant capability of a device is a very important aspect for preventing damage of an intelligent ODN device and improving reliability thereof.

Because basically only fiber fusion work is performed during the onsite construction of an optical distribution device, but what intelligent optical fiber distribution management deals with is electronized management of distribution information, so adopting a fusion-distribution separation manner may solve the foregoing problems well. That is, electronic circuits needed by intelligentized management are all designed onto a distribution machine disc, and a fiber fusion machine disc is taken independent and is connected through an optical fiber. In this way, during the onsite construction of the device, only a fiber fusion disc without the electronic circuit is processed, but a distribution disc circuit vulnerable to fouling and the static electricity is prohibited from onsite processing. In this way, the device may be protected from the damage by the onsite construction. However, this processing manner still has the following problems:

(1) Fusion-distribution separation deviates from a development direction of fusion-distribution integration, and reduces installation density of the device.

(2) A distribution disc is not without an optical fiber fusion splice point, but fusion splice is performed during device production, to prevent onsite fusion splice. However, the fusion splice point still fails to be free from a default during device running, and is still endangered by the fouling and static electricity harm during the onsite construction.

(3) A section of optical cable is added between the fiber fusion disc and the distribution disc, increasing device cost.

(4) After the fiber fusion disc is separated, a fiber fusion component still needs to be configured on the distribution disc, further increasing the device cost.

(5) The optical fiber fusion splice point is added to the device, increasing line loss, and reducing the reliability.

(6) A fiber fusion operation on the distribution disc adds a procedure of the device production, increasing production cost of the device.

(7) The optical cable between the fiber fusion disc and the distribution disc limits onsite operation space of fiber fusion construction, being unfavorable to improve onsite construction efficiency.

Therefore, the fusion-distribution separation manner for designing an intelligent optical distribution device may though solve the problem of the fouling and the static electricity harm during the onsite construction to a certain extent, but at the same time brings a series of other problems, limiting the development of the device and technology, limiting improvement of the onsite construction efficiency, increasing the production cost of the device, and raising a higher requirement for the onsite construction persons and a higher requirement for a management system; and these harms fail to be complete eradicated.

Another method is that: the optical distribution disc is installed in a rigorously designed protective shell, but a rear panel interface and an optical distribution interface of the machine disc must be exposed, and therefore the exposed circuit hard to be shielded still exists. Although the reliability of the optical distribution disc may be improved to a certain extent, accompanied increase of the cost cannot provide perfect circuit protection.

In summary, introduction of an electronic label technology into the ODN network for distribution management has an obvious advantage, but it requires the circuit to be arranged on an optical fiber distribution disc for identity information management of the distribution optical fiber connector. A defect of the electronic circuit being easily harmed by the static electricity and damaged by swage and the short circuit makes the distribution device difficult to withstand an impact of a harsh work environment for the onsite construction of the device, very easily causing the damage of the machine disc. Both a fusion-distribution separation design scheme and a scheme of adding a protective shell to the machine disc may alleviate the foregoing problems, but at the same time it brings a series of other problems, limiting the development of the device and technology, limiting the improvement of the onsite construction efficiency, and protecting the device not so closely. Therefore, no matter whether the fusion-distribution separation is required, the anti-static capability and fouling-resistant capability of an intelligent optical distribution disc must be able to be improved, and a good protection capability must be able to be provided for an interface that fails to be protected by a shell. Only in this way, the reliability of the device may be fundamentally increased. Undoubtedly, this is a very difficult technical problem that needs urgent settlement.

SUMMARY

The present invention aims to overcome a deficiency of the foregoing background technology, and provides a circuit for realizing passivation of an intelligent optical distribution interface disc in a machine disc enable manner. No matter whether in a fusion-distribution integration or fusion-distribution separation design, in an onsite construction phase, a distribution disc has both strong anti-static capability and fouling-resistant capability. When the fusion-distribution integration design is used, the device cost can be reduced, the device production process can be reduced, and the device performance and the distribution density can be increased. When the fusion-distribution separation design is used, even an optical fiber fusion splice point on the distribution disc generates failure, over-high requirements may not be put forward for maintenance and construction.

1The circuit for realizing passivation of an intelligent optical distribution interface disc in a machine disc enable manner provided by the present invention includes an intelligent distribution management disc and several distribution interface discs respectively connected to the intelligent distribution management disc, and further includes a port read-write bus and several machine disc enable lines. All distribution interface discs are passivated distribution interface discs, where the passivated distribution interface discs are connected respectively through a machine disc enable line to the intelligent distribution management disc, and the intelligent distribution management disc is further connected through the port read-write bus to the passivated distribution interface discs. All the passivated distribution interface discs are uniformly managed in a matrix manner.

2In the foregoing technical solution, the passivated distribution interface disc comprises several distribution information read-write interfaces and several distribution port indicators; each distribution information read-write interface comprises a reference control end and a signal read-write end; each distribution port indicator comprises a reference management end and a display control end; the intelligent distribution management disc uniformly manages a read-write operation of optical fiber distribution information of any distribution information read-write interface in each passivated distribution interface disc, and controls display information of the corresponding distribution port indicator.

3In the foregoing technical solution, the reference control end of each distribution information read-write interface and the reference management end of each distribution port indicator may be connected to a ground cable.

4In the foregoing technical solution, the reference control end of each distribution information read-write interface and the reference management end of each distribution port indicator may be connected to a power supply.

5In the foregoing technical solution, the intelligent distribution management disc may adopt a grouped port control manner to manage the distribution information read-write interfaces and the distribution port indicators.

6In the foregoing technical solution, the intelligent distribution management disc includes a port information read-write module, a port instruction control module and a machine disc enable control module. The port information read-write module draws forth several distribution information read-write lines. A signal read-write end of a distribution information read-write interface with a same port number in each passivated distribution interface disc is respectively connected parallel to the distribution information read-write line corresponding to the port number. The port instruction control module draws forth several port instruction control lines. A display control end of a distribution port indicator with the same port number in each passivated distribution interface disc is respectively connected parallel to the port instruction control line corresponding to the port number. Each distribution information read-write line and each port instruction control line jointly form a port read-write bus.

7In the foregoing technical solution, the machine disc enable control module in the intelligent distribution management disc adopts a combined machine disc enable manner to manage the distribution information read-write interfaces and the distribution port indicators.

8In the foregoing technical solution, the reference control end of each distribution information read-write interface in the passivated distribution interface disc is connected to the reference management end of each distribution port indicator, to form the machine disc enable line of the passivated distribution interface disc. The machine disc enable line of each passivated distribution interface disc is connected to the machine disc enable control module is connected to the machine disc enable control module 8 in the intelligent distribution management disc.

9 In the foregoing technical solution, the machine disc enable control module in the intelligent distribution management disc adopts a grouped machine disc enable manner according to a certain rule to manage each distribution information read-write interface and each distribution port indicator.

10 In the foregoing technical solution, the machine disc enable lines are grouped into a machine disc read-write enable line and a machine disc instruction enable line. The reference control end of each distribution information read-write interface in a passivated distribution interface disc is connected as a machine disc read-write enable line of the passivated distribution interface disc. The reference management end of each distribution port indicator in each passivated distribution interface disc is connected as a machine disc instruction enable line of the passivated distribution interface disc. The machine disc read-write enable line and the machine disc instruction enable line of each passivated distribution interface disc are connected to a machine disc enable control module in the intelligent distribution management disc.

11 In the foregoing technical solution, the machine disc enable lines are divided into several machine disc read-write grouping enable lines and several machine disc instruction grouping enable lines. The distribution information read-write interfaces in each passivated distribution interface disc are divided into at least two groups according to a rule formulated in advance. The reference control ends of the distribution information read-write interfaces grouped into a same group are connected as the machine disc read-write grouping enable line of the distribution information read-write interfaces of this group. The distribution port indicators in each passivated distribution interface disc are also divided into at least two groups according to the same rule. The reference management ends of the distribution port indicators grouped into a same group are connected as the machine disc instruction grouping enable line of the distribution port indicators of this group. All machine disc read-write grouping enable lines and machine disc instruction grouping enable lines are connected to the machine disc enable control module in the intelligent distribution management disc.

12 In the foregoing technical solution, the distribution information read-write interfaces and distribution port indicators in each passivated distribution interface disc are respectively divided into two groups according to parity of a port number. The distribution information read-write interfaces whose port number is an odd number is grouped to form a group, the distribution information read-write interfaces whose port number is an even number is grouped to form a group, the distribution port indicators whose port number is the odd number is grouped to form a group, and the distribution port indicators whose port number is the even number is grouped to form a group. The reference control ends of the distribution information read-write interfaces grouped into the same group are connected to form the machine disc read-write grouping enable line of the distribution information read-write interfaces of this group. The reference management ends of the distribution port indicators grouped into the same group are connected to form the machine disc instruction grouping enable line of the distribution port indicators of this group. All machine disc read-write grouping enable lines and all machine disc instruction grouping enable lines of each passivated distribution interface disc are connected to the machine disc enable control module in the intelligent distribution management disc.

13 In the foregoing technical solution, the distribution information read-write interfaces and distribution port indicators in each passivated distribution interface disc are evenly divided into at least two groups respectively in an ascending order or a descending order of the port numbers. The reference control ends of each distribution information read-write interface grouped into a same group are connected to form at least two machine disc read-write grouping enable lines of the passivated distribution interface disc where the distribution information read-write interface is located. The reference management ends of each distribution port indicator grouped into a same group are connected to form at least two machine disc instruction grouping enable lines of the passivated distribution interface disc where the distribution port indicator is located. All machine disc read-write grouping enable lines and all machine disc instruction grouping enable lines of each passivated distribution interface disc are connected to the machine disc enable control module in the intelligent distribution management disc.

14 In the foregoing technical solution, the machine disc enable lines are grouped into several machine disc grouping enable lines whose functions are basically the same. In each passivated distribution interface disc, the distribution information read-write interface whose port number is an odd number and the distribution port indicator whose port number is the odd number match each other and are grouped into a same group. In each passivated distribution interface disc, the distribution information read-write interface whose port number is an even odd number and the distribution port indicator whose port number is the even number match each other and are grouped into a same group. The reference control ends of each distribution information read-write interface grouped into the same group and the reference management ends of each distribution port indicator grouped into the same group are connected, to form one machine disc grouping enable line corresponding to this group. All machine disc grouping enable lines are connected to the machine disc enable control module in the intelligent distribution management disc.

15 In the foregoing technical solution, the machine disc enable lines are grouped into several machine disc grouping enable lines whose functions are basically the same. Each distribution information read-write interface and each distribution port indicator in each passivated distribution interface disc are evenly divided into at least two groups respectively in an ascending order or a descending order of the port numbers. The distribution information read-write interface and the distribution port indicator with the same port numbers match each other and are grouped into a same group. The reference control ends of each distribution information read-write interface in each group the reference management ends of each distribution port indicator in this group are connected, to form one machine disc grouping enable line corresponding to this group. All machine disc grouping enable lines are connected to the machine disc enable control module in the intelligent distribution management disc.

16 In the foregoing technical solution, the intelligent distribution management disc includes a port information read-write module, a port instruction control module, and the machine disc enable control module. The port information read-write module draws forth several distribution information read-write lines, and numbers the several distribution information read-write lines in sequence. The port instruction control module draws forth several port instruction control lines, and numbers the several port instruction control lines in sequence. Each numbered distribution information read-write line and each numbered port instruction control line jointly form a port read-write bus. The machine disc enable control module adopts the grouped machine disc enable manner according to a certain rule to manage each distribution information read-write interface and each distribution port indicator.

17 In the foregoing technical solution, the machine disc enable lines are grouped into several machine disc grouping enable lines whose functions are basically the same. In each passivated distribution interface disc, the distribution information read-write interface whose port number is an odd number and the distribution port indicator whose port number is the odd number match each other and are grouped into a same group. In each passivated distribution interface disc, the distribution information read-write interface whose port number is an even number and the distribution port indicator whose port number is the even number match each other and are grouped into a same group. The reference control ends of each distribution information read-write interface grouped into the same group and the reference management ends of each distribution port indicator grouped into the same group are connected, to form one machine disc grouping enable line corresponding to this group. All machine disc grouping enable lines are connected to the machine disc enable control module in the intelligent distribution management disc.

18 In the foregoing technical solution, the machine disc enable lines are grouped into several machine disc grouping enable lines whose functions are basically the same. Each distribution information read-write interface and each distribution port indicator in each passivated distribution interface disc are evenly divided into at least two groups respectively in an ascending order or a descending order of the port numbers. The distribution information read-write interface and the distribution port indicator with the same port numbers match each other and are grouped into a same group. The reference control ends of each distribution information read-write interface in each group the reference management ends of each distribution port indicator in this group are connected, to form one machine disc grouping enable line corresponding to this group. All machine disc grouping enable lines are connected to the machine disc enable control module in the intelligent distribution management disc.

19 In the foregoing technical solution, after each distribution information read-write interface and each distribution port indicator in the passivated distribution interface disc are grouped according to a certain rule, in each group of each in each passivated distribution interface disc, the ports are grouped and numbered in sequence again. The signal read-write ends of each distribution information read-write interface with a same group number between each group in each passivated distribution interface disc are jointly connected parallel to the distribution information read-write line that the port information read-write module draws forth and is corresponding to this group number. The display control ends of each distribution port indicator with the same group number between each group in each passivated distribution interface disc are jointly connected parallel to the port instruction control line that the port instruction control module draws forth and is corresponding to this group number.

20 In the foregoing technical solution, the intelligent distribution management disc adopts a combined port control management manner to manage the distribution information read-write interfaces and the distribution port indicators.

21 In the foregoing technical solution, the intelligent distribution management disc includes the port information read-write module and the machine disc enable control module. The port information read-write instruction control module draws forth several port read-write control lines. In each passivated distribution interface disc, the signal read-write end of the distribution information read-write interface and the display control end of the distribution port indicator that have a same port number are jointly connected parallel to the port read-write control line corresponding to the port number. Each port read-write control line jointly forms the port read-write bus. The port information read-write instruction control module in the intelligent distribution management disc performs port combination, control, and management on the distribution information read-write interface and the distribution port indicator in each passivated distribution interface disc.

22 In the foregoing technical solution, the machine disc enable control module in the intelligent distribution management disc adopts the grouped machine disc enable manner according to a certain rule to manage the distribution information read-write interfaces and the distribution port indicators.

23 In the foregoing technical solution, the machine disc enable lines are grouped into a machine disc read-write enable line and a machine disc instruction enable line. The reference control end of each distribution information read-write interface in the passivated distribution interface disc is connected as the machine disc read-write enable line of the passivated distribution interface disc. The reference management end of each distribution port indicator is connected as the machine disc instruction enable line of the passivated distribution interface disc. The machine disc read-write enable line and the machine disc instruction enable line of each passivated distribution interface disc are connected to the machine disc enable control module in the intelligent distribution management disc.

24 In the foregoing technical solution, the machine disc enable lines are divided into several machine disc read-write grouping enable lines and several machine disc instruction grouping enable lines. The distribution information read-write interfaces in each passivated distribution interface disc are divided into at least two groups according to a rule formulated in advance. The reference control ends of the distribution information read-write interfaces grouped into a same group are connected as the machine disc read-write grouping enable line of the distribution information read-write interfaces of this group. The distribution port indicators in each passivated distribution interface disc are also divided into at least two groups according to the same rule. The reference management ends of the distribution port indicators grouped into a same group are connected as the machine disc instruction grouping enable line of the distribution port indicators of this group. All machine disc read-write grouping enable lines and machine disc instruction grouping enable lines are connected to the machine disc enable control module in the intelligent distribution management disc.

25 In the foregoing technical solution, the distribution information read-write interfaces and distribution port indicators in each passivated distribution interface disc are respectively divided into two groups according to parity of a port number. The distribution information read-write interfaces whose port number is an odd number is grouped to form a group, the distribution information read-write interfaces whose port number is an even number is grouped to form a group, the distribution port indicators whose port number is the odd number is grouped to form a group, and the distribution port indicators whose port number is the even number is grouped to form a group. The reference control ends of the distribution information read-write interfaces grouped into the same group are connected to form the machine disc read-write grouping enable line of the distribution information read-write interfaces of this group. The reference management ends of the distribution port indicators grouped into the same group are connected to form the machine disc instruction grouping enable line of the distribution port indicators of this group. All machine disc read-write grouping enable lines and all machine disc instruction grouping enable lines of each passivated distribution interface disc are connected to the machine disc enable control module in the intelligent distribution management disc.

26In the foregoing technical solution, the distribution information read-write interfaces and distribution port indicators in each passivated distribution interface disc are evenly divided into at least two groups respectively in an ascending order or a descending order of the port numbers. The reference control ends of each distribution information read-write interface grouped into a same group are connected to form at least two machine disc read-write grouping enable lines of the passivated distribution interface disc where the distribution information read-write interface is located. The reference management ends of each distribution port indicator grouped into a same group are connected to form at least two machine disc instruction grouping enable lines of the passivated distribution interface disc where the distribution port indicator is located. All machine disc read-write grouping enable lines and all machine disc instruction grouping enable lines of each passivated distribution interface disc are connected to the machine disc enable control module in the intelligent distribution management disc.

27In the foregoing technical solution, the intelligent distribution management disc further draws forth a disc in-position monitoring line; each passivated distribution interface disc further includes a disc in-position instruction signal line; one end of the disc in-position instruction signal line is connected through an unidirectional level clamper to any one of the machine disc enable lines, machine disc read-write enable lines, machine disc instruction enable lines, machine disc grouping enable lines, machine disc read-write grouping enable lines, or machine disc instruction grouping enable lines of the passivated distribution interface disc where the disc in-position instruction signal line is located, and the other end is connected to the disc in-position monitoring line.

28In the foregoing technical solution, the intelligent distribution management disc further draws forth several disc in-position monitoring lines; each passivated distribution interface disc further comprises the disc in-position instruction signal line; one end of the disc in-position instruction signal line is grounded, and the other end is connected through the disc in-position monitoring line to a disc in-position monitoring end corresponding to the intelligent distribution management disc, to perform independent disc in-position monitoring.

29In the foregoing technical solution, the intelligent distribution management disc further includes an interface disc type monitoring module; the interface disc type monitoring module is a CPLD, an FPGA, or an input bus of a microprocessor and a software management logic thereof having or not having a disc in-position instruction function. Each passivated distribution interface disc further includes a disc type encoder and several interface disc type instruction lines. One end of each interface disc type instruction line is connected through the disc type encoder to any one of the machine disc enable lines, machine disc read-write enable lines, machine disc instruction enable lines, machine disc grouping enable lines, machine disc read-write grouping enable lines, or machine disc instruction grouping enable lines of the passivated distribution interface disc where the interface disc type instruction line is located, and the other end is connected to the disc type instruction line corresponding to another passivated distribution interface disc according to code position configuration for a code of the instruction line, to form a disc type monitoring line; the disc type monitoring line is connected to the interface disc type monitoring module.

30In the foregoing technical solution, the intelligent distribution management disc further draws forth several disc in-position monitoring lines; each passivated distribution interface disc further comprises the disc in-position instruction signal line; one end of the disc in-position instruction signal line is grounded, and the other end is connected through the disc in-position monitoring line to the disc in-position monitoring end corresponding to the intelligent distribution management disc, to perform the independent disc in-position monitoring. The intelligent distribution management disc further includes the interface disc type monitoring module; the interface disc type monitoring module is the CPLD, the FPGA, or the input bus of the microprocessor and the software management logic thereof not having the disc in-position instruction function. Each passivated distribution interface disc further includes a disc type encoder and several interface disc type instruction lines. One end of each interface disc type instruction line is connected through the disc type encoder to any one of the machine disc enable lines, machine disc read-write enable lines, machine disc instruction enable lines, machine disc grouping enable lines, machine disc read-write grouping enable lines, or machine disc instruction grouping enable lines of the passivated distribution interface disc where the interface disc type instruction line is located, and the other end is connected to the disc type instruction line corresponding to another passivated distribution interface disc according to code position configuration for the code of the instruction line, to form the disc type monitoring line; the disc type monitoring line is connected to the interface disc type monitoring module.

31In the foregoing technical solution, the port information read-write module is the complex programmable logic device CPLD, the field programmable gate array FPGA, or the read-write bus of the microprocessor and the software management logic device thereof.

32In the foregoing technical solution, the port instruction control module is the CPLD, the FPGA, or an output bus of the microprocessor and a software management device thereof.

33In the foregoing technical solution, the port information read-write instruction control module is the CPLD, the FPGA, the read-write bus of the microprocessor and the software management logic device thereof, or the output bus of the microprocessor and the software management device thereof.

34In the foregoing technical solution, the machine disc enable control module 8 is an analog switch or a field-effect pipe controlled through a programmable hardware management logic of the CPLD or the FPGA or the output bus of the microprocessor and the software management logic, a high frequency enable controller with a radio frequency identification RFID, or a logic output device with high resistance forbidding or low level absorption current/high level supply current enable.

35In the foregoing technical solution, the distribution information read-write interface is an optical fiber adapter with a capability of reading identity information on an optical fiber moveable connector.

36In the foregoing technical solution, a carrier of the identity information on the optical fiber moveable connector is the RFID or an eID chip.

37In the foregoing technical solution, when the carrier of the identity information on the optical fiber moveable connector is an eID chip, the reference control end and signal read-write end of the distribution information read-write interface are both metal plug-in springs.

38In the foregoing technical solution, when the carrier of the identity information on the optical fiber moveable connector is an RFID, an information read-write antenna is configured between the reference control end and signal read-write end of the distribution information read-write interface.

39In the foregoing technical solution, the distribution port indicator is an indicator, a light emitting diode LED or a liquid crystal display LCD.

40In the foregoing technical solution, the unidirectional level clamper may be a diode or a unidirectional level damper circuit.

Compared with the prior art, advantages of the present invention are as follows:

(1) In the present invention, a distribution port is separated from distribution management, all management circuits on a distribution interface disc are moved out, and all control and management functions are achieved on a distribution management disc, to enable passivation to be performed on a distribution interface disc circuit, i.e. any active electronic devices such as integrated circuits, triodes, etc. which are easily damaged by static electricity and affected by fouling are not placed on the distribution interface disc any longer, and power lines are not introduced in the distribution interface disc. No matter whether in the fusion-distribution integration or fusion-distribution separation design, during the onsite construction, the distribution disc has both the strong anti-static capability and fouling-resistant capability.

(2) A passivation design of the circuit for an intelligent ODN distribution device interface disc may greatly increase the anti-static capability and fouling-resistant capability of the machine disc. In this way, no matter whether in the fusion-distribution integration or fusion-distribution separation design, the distribution device do not need to raise a special protection requirement for the distribution interface disc during the device onsite construction. Therefore limitations on a site and persons of the onsite construction may be reduced, and construction efficiency and convenience may be improved. There is no active electronic device on the machine disc. Therefore, no protective shell needs to be added to the machine disc, and an exposed rear panel interface and optical distribution interface of the machine disc naturally have the very strong anti-static capability and fouling-resistant capability without special protection. In this way, after the machine disc is pulled out, static protection may not need to be considered. Slight fouling or damage will not cause device damage and even not affect normal work of the device, as long as a short circuit resistance is not too small.

(3) When the fusion-distribution integration design is used by the device, the device cost can be reduced, the device production process can be reduced, and the device performance and the distribution density can be increased.

(4) When the fusion-distribution separation design is used by the device, even the optical fiber fusion splice point on the distribution disc generates the failure, the over-high requirements may not be put forward for the maintenance and construction.

(5) The distribution disc almost does not consume electrical energy after being passivated, and there are a large number of distribution interface discs in an intelligent distribution device, which is greatly helpful for reducing energy consumption of the device and extending continuous power supply work time.

The foregoing advantages have very important and positive significance for improving the reliability of the device, extending a service life of the device, and reducing the cost of purchasing, the construction, and the maintenance of a system and the device.

In the figures: 1—intelligent distribution management disc, 2—passivated distribution interface disc, 3—distribution information read-write interface, 4—distribution port indicator, 5—disc type encoder, 6—port information read-write module, 7—port instruction control module, 8—machine disc enable control module, 9—interface disc type monitoring module, 10—port information read-write instruction control module, and 11—unidirectional level clamper.

DETAILED DESCRIPTION OF THE INVENTION

The following, with reference to attached figures and embodiments, further describes in detail the present invention.

Figure 1:
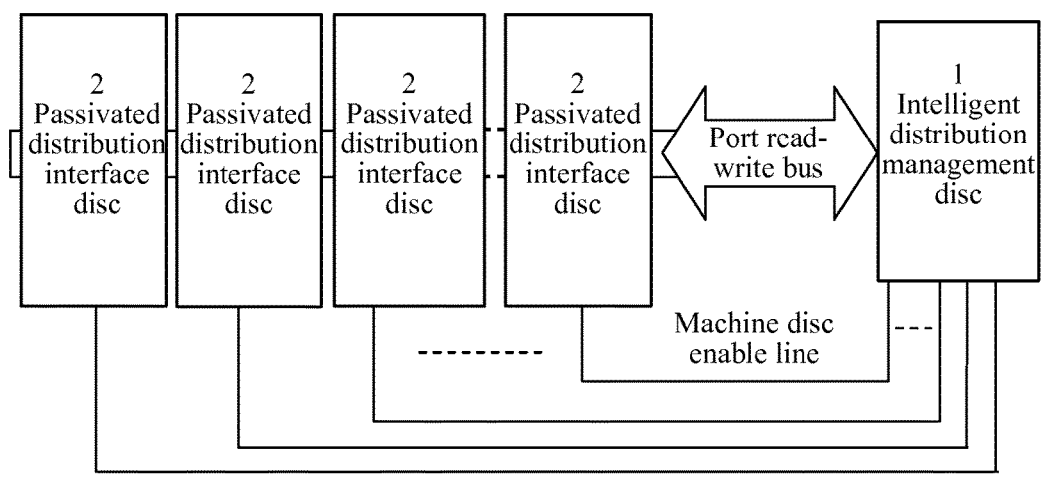
FIG. 1 is an overall schematic structural diagram of a circuit for realizing passivation of an intelligent optical distribution interface disc in a machine disc enable manner according to embodiments of the present invention.

Referring to FIG. 1, the circuit for realizing passivation of an intelligent optical distribution interface disc in a machine disc enable manner provided by embodiments of the present invention includes an intelligent distribution management disc 1 and several distribution interface discs respectively connected to the intelligent distribution management disc 1, and a port read-write bus and several machine disc enable lines. All distribution interface discs are passivated distribution interface discs 2, where the passivated distribution interface discs 2 are connected respectively through a machine disc enable line to the intelligent distribution management disc 1, and the intelligent distribution management disc 1 is further connected through the port read-write bus to the passivated distribution interface discs 2. Ports of all the passivated distribution interface discs 2 are uniformly managed in a matrix manner.

Figure 2:
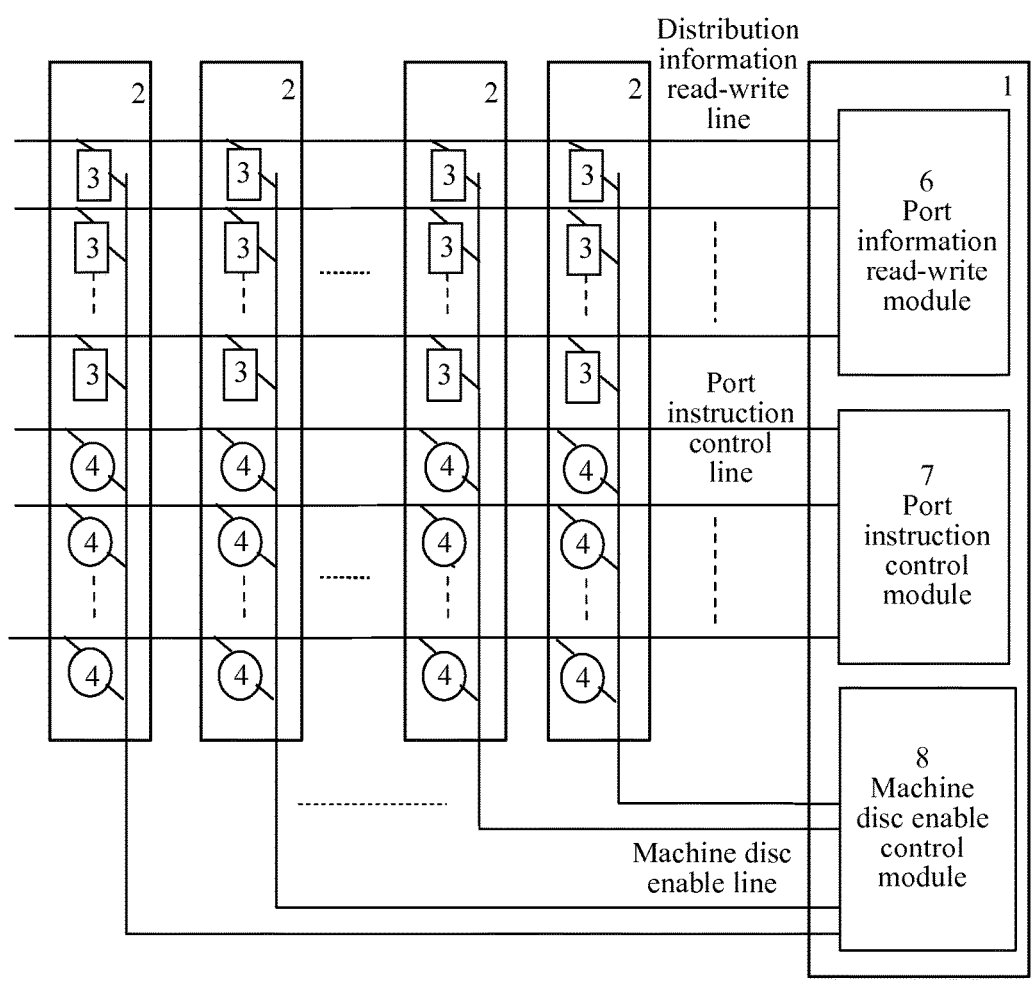
FIG. 2 is a circuit diagram according to embodiment 1.1 of the present invention.

Referring to FIG. 2, the passivated distribution interface discs 2 include several distribution information read-write interfaces 3 and several distribution port indicators 4, where each distribution information read-write interface 3 includes a reference control end and a signal read-write end, and each distribution port indicator 4 includes a reference management end and a display control end. The reference control ends of all the distribution information read-write interfaces 3 and the reference management ends of all the distribution port indicators 4 may be all connected to a ground cable or to a power supply.

The distribution information read-write interface 3 is an optical fiber adapter with a capability of reading identity information on an optical fiber moveable connector. A carrier of the identity information on the optical fiber moveable connector is an RFID (Radio Frequency Identification, radio frequency identification, also called a wireless electronic label) or an eID chip. When the carrier of the identity information on the optical fiber moveable connector is an eID chip, the reference control end and signal read-write end of the distribution information read-write interface 3 are both metal plug-in springs; when the carrier of the identity information on the optical fiber moveable connector is an RFID, an information read-write antenna is configured between the reference control end and signal read-write end of the distribution information read-write interface 3. A distribution port indicator 4 is an indicator, an LED (Light Emitting Diode, light emitting diode) or an LCD (Liquid Crystal Display, liquid crystal display).

To further increase a port management capacity of a bus, or to manage the ports by type, various port devices needing to be managed may be grouped for management; to decrease the number of the buses, read-write control lines in different groups may further be combined, controlled, and managed according to a certain rule. In other words, the intelligent distribution management disc 1 may control the ports not only in a grouped port control manner, but also in a combined port control manner. On a basis of selecting the grouped port control manner, the intelligent distribution management disc 1 may enable the machine disc not only in a combined machine disc enable manner, but also in a grouped machine disc enable manner. On a basis of selecting the combined port control manner, the intelligent distribution management disc 1 may enable the machine disc in the grouped machine disc enable manner according to a certain rule. The grouped machine disc enable manner may be broken down into several types according to different grouping rules. For example, the ports of the distribution information read-write interface 3 and the distribution port indicator 4 may be respectively connected to form a group, and the ports of the distribution information read-write interface 3 and the distribution port indicator 4 may be also be divided into 2 groups respectively according to parity of a port number, or may be evenly divided into two or more groups respectively in an ascending order or a descending order of port numbers, to respectively perform grouped machine disc enable control.

On a basis of selecting the grouped machine disc enable control, combination may be performed for port control. All distribution information read-write interfaces 3 and all distribution port indicators 4 managed by different grouping enable lines respectively connect signal read-write ends or display control ends with the same number or the same group number in sequence to performs port combination, control, and management, and finally form various basic circuits that have only one distribution information read-write interface 3 or one distribution port indicator 4 at each cross point of a port control management line and a machine disc enable (or grouping enable) line, to uniformly manage a read-write operation of optical fiber distribution information of any distribution information read-write interface 3 in the passivated distribution interface discs 2, and control display information of the corresponding distribution port indicator 4.

In addition, on a basis of forming the foregoing various basic circuits, to enable the intelligent distribution management disc 1 and a upper-layer network management system thereof to know which distribution disc positions are installed with the passivated distribution interface discs 2, and a disc in-position instruction signal line (further divided into 2 connection manners) may further be configured on each passivated distribution interface disc 2, so that the disc position of this disc may be reported through the disc in-position instruction signal line. Because the passivated distribution interface discs 2 have multiple types, to make the intelligent distribution management disc 1 and the upper-layer network management system thereof perceive and discern the types of the passivated distribution interface discs 2, an interface disc type instruction line may be configured on each passivated distribution interface disc 2, so that the disc type of this disc may be reported through the interface disc type instruction line. A more preferable scheme may be adopted, to report the disc position and disc type of this disc at the same time.

The following respectively describes, through 11 specific embodiments, the basic circuits that adopt grouped/combined port control or grouped/combined machine disc enable.

Embodiment 1.1: Grouped Port Control+Combined Machine Disc Enable

Referring to FIG. 2, a basic circuit connection of a grouped port control manner is as follows: an intelligent distribution management disc 1 includes a port information read-write module 6, a port instruction control module 7 and a machine disc enable control module 8. The port information read-write module 6 draws forth several distribution information read-write lines. Signal read-write ends of distribution information read-write interfaces 3 with the same port number in all the passivated distribution interface discs 2 are respectively connected in parallel to the distribution information read-write line corresponding to the port number; the port instruction control module 7 draws forth several port instruction control lines. Display control ends of distribution port indicators 4 with the same port number in all the passivated distribution interface discs 2 are respectively connected in parallel to the port instruction control line corresponding to the port number. All the distribution information read-write lines and all the port instruction control lines jointly form a port read-write bus.

The port information read-write module 6 is a CPLD (Complex Programmable Logic Device, complex programmable logic device), an FPGA (Field Programmable Gate Array, field programmable gate array), or a read-write bus of a microprocessor and a software management logic device thereof. The port instruction control module 7 is the CPLD, the FPGA, or an output bus of the microprocessor and a software management device thereof. The machine disc enable control module 8 is an analog switch or an MOS pipe (field-effect pipe) controlled through a programmable hardware management logic of the CPLD or the FPGA or the output bus of the microprocessor and a software management logic, a high frequency enable controller with a radio frequency identification RFID, or a logic output device with high resistance forbidding or low level absorption current (or high level supply current) enable.

Figure 3:
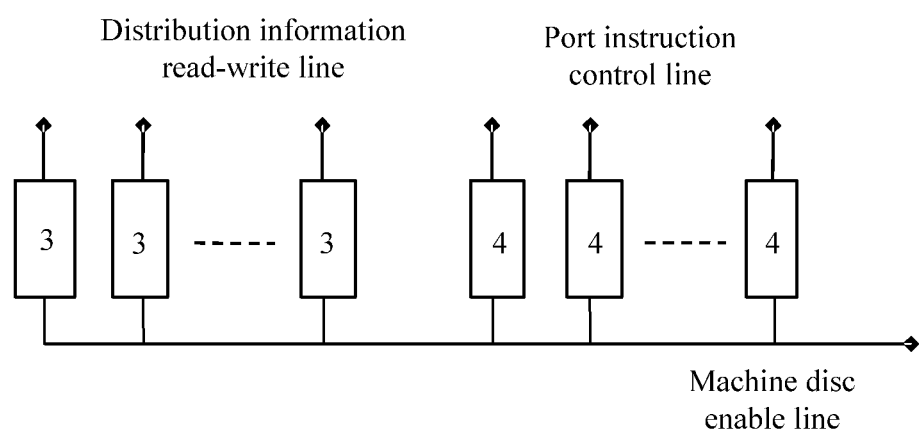
FIG. 3 is a circuit diagram inside a passivated distribution interface disc according to embodiment 1.1 of the present invention.

On a basis of the grouped port control manner, the basic circuit connection of a combined machine disc enable manner is as follows: referring to FIG. 3, the reference control ends of all the distribution information read-write interfaces 3 in the passivated distribution interface discs 2 are connected to the reference management ends of all the distribution port indicators 4, to form the machine disc enable lines of the passivated distribution interface discs 2. The machine disc enable lines of all the passivated distribution interface disc 2 are connected to the machine disc enable control module 8 in the intelligent distribution management disc 1.

Embodiment 1.2: Grouped Port Control+Grouped Machine Disc Enable (Respectively Connected to Form a Group)

Figure 4:
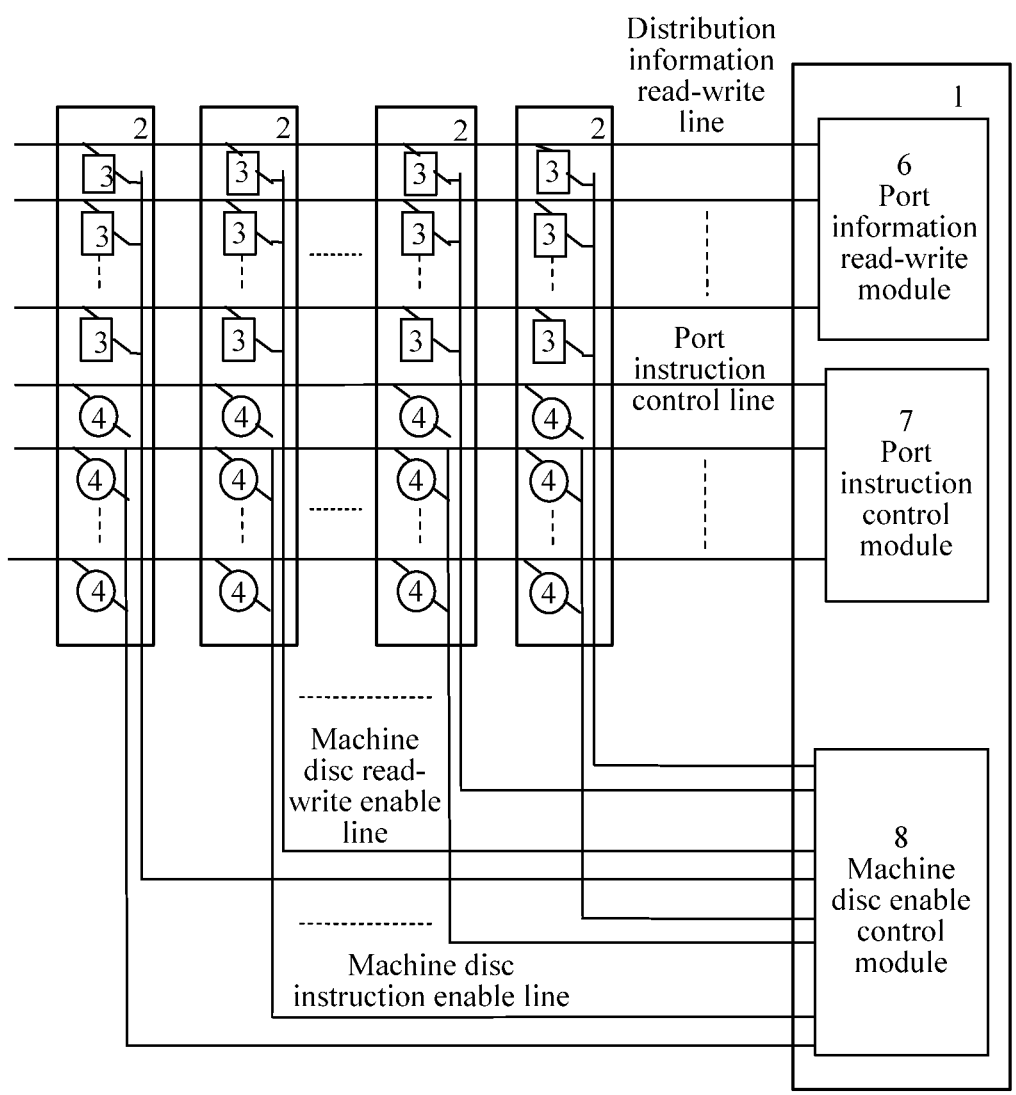
FIG. 4 is a circuit diagram according to embodiment 1.2 of the present invention.
Figure 5:
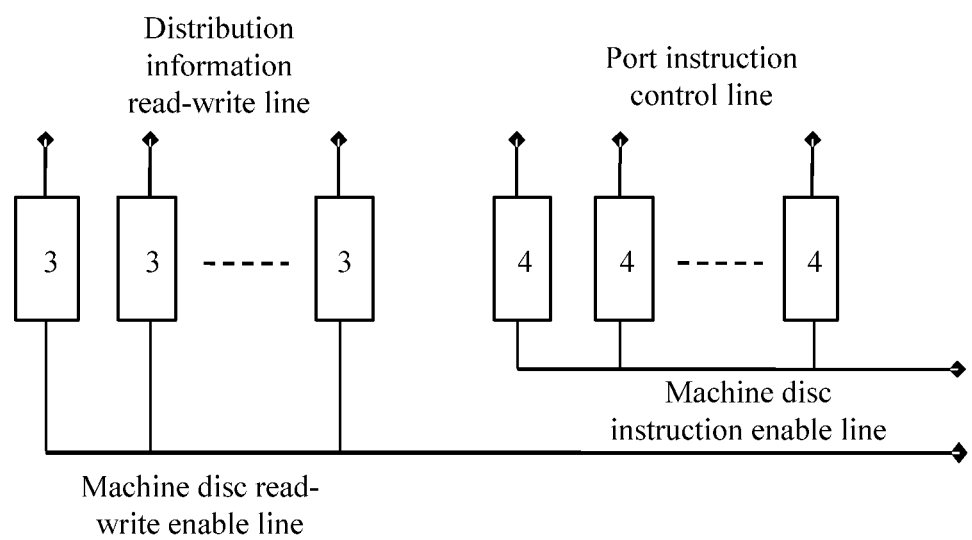
FIG. 5 is a circuit diagram inside a passivated distribution interface disc according to embodiment 1.2 of the present invention.

Referring to FIG. 4 and FIG. 5, on a basis of the grouped port control manner in embodiment 1.1, each original machine disc enable line is divided into a machine disc read-write enable line and a machine disc instruction enable line. The reference control ends of all the distribution information read-write interfaces 3 in the passivated distribution interface discs 2 are connected as machine disc read-write enable lines of the passivated distribution interface discs 2. The reference management ends of all the distribution port indicators 4 are connected as machine disc instruction enable lines of the passivated distribution interface discs 2. The machine disc read-write enable lines and the machine disc instruction enable lines of all the passivated distribution interface discs 2 are connected to a machine disc enable control module 8 in the intelligent distribution management disc 1.

Embodiment 1.3: Grouped Port Control+Grouped Machine Disc Enable (2 Groups Respectively for an Odd Number and an Even Number)

On a basis of the grouped port control manner in embodiment 1.1, the machine disc enable line is divided into a machine disc read-write grouping enable line and a machine disc instruction grouping enable line. The distribution information read-write interfaces 3 and distribution port indicators 4 in each passivated distribution interface disc 2 are respectively divided into two groups according to parity of a port number. The distribution information read-write interfaces 3 whose port number is an odd number is grouped to form a group, the distribution information read-write interfaces 3 whose port number is an even number is grouped to form a group, the distribution port indicators 4 whose port number is the odd number is grouped to form a group, and the distribution port indicators 4 whose port number is the even number is grouped to form a group. The reference control ends of the distribution information read-write interfaces 3 grouped into the same group are connected to form a machine disc read-write grouping enable line of the distribution information read-write interfaces 3 of this group. The reference management ends of the distribution port indicators 4 grouped into the same group are connected to form the machine disc instruction grouping enable line of the distribution port indicators 4 of this group. All machine disc read-write grouping enable lines and all machine disc instruction grouping enable lines of the passivated distribution interface disc 2 are connected to the machine disc enable control module 8 in the intelligent distribution management disc 1.

Embodiment 1.4: Grouped Port Control+Grouped Machine Disc Enable (Evenly Divided into at Least Two Groups Respectively)

On a basis of the grouped port control manner in embodiment 1.1, the machine disc enable line is divided into a machine disc read-write grouping enable line and a machine disc instruction grouping enable line. The distribution information read-write interfaces 3 and distribution port indicators 4 in each passivated distribution interface disc 2 are evenly divided into at least two groups respectively in an ascending order or a descending order of the port numbers. The reference control ends of all the distribution information read-write interfaces 3 grouped into the same group are connected to form at least two machine disc read-write grouping enable lines of the passivated distribution interface discs 2 where the distribution information read-write interface 3 is located. The reference management ends of all the distribution port indicators 4 grouped into the same group are connected to form at least two machine disc instruction grouping enable lines of the passivated distribution interface discs 2 where the distribution port indicator 4 is located. All machine disc read-write grouping enable lines and all machine disc instruction grouping enable lines of the passivated distribution interface discs 2 are connected to the machine disc enable control module 8 in the intelligent distribution management disc 1.

Embodiment 1.5: Grouped Port Control+Grouped Machine Disc Enable (2 Groups for an Odd Number and an Even Number)

Figure 6:
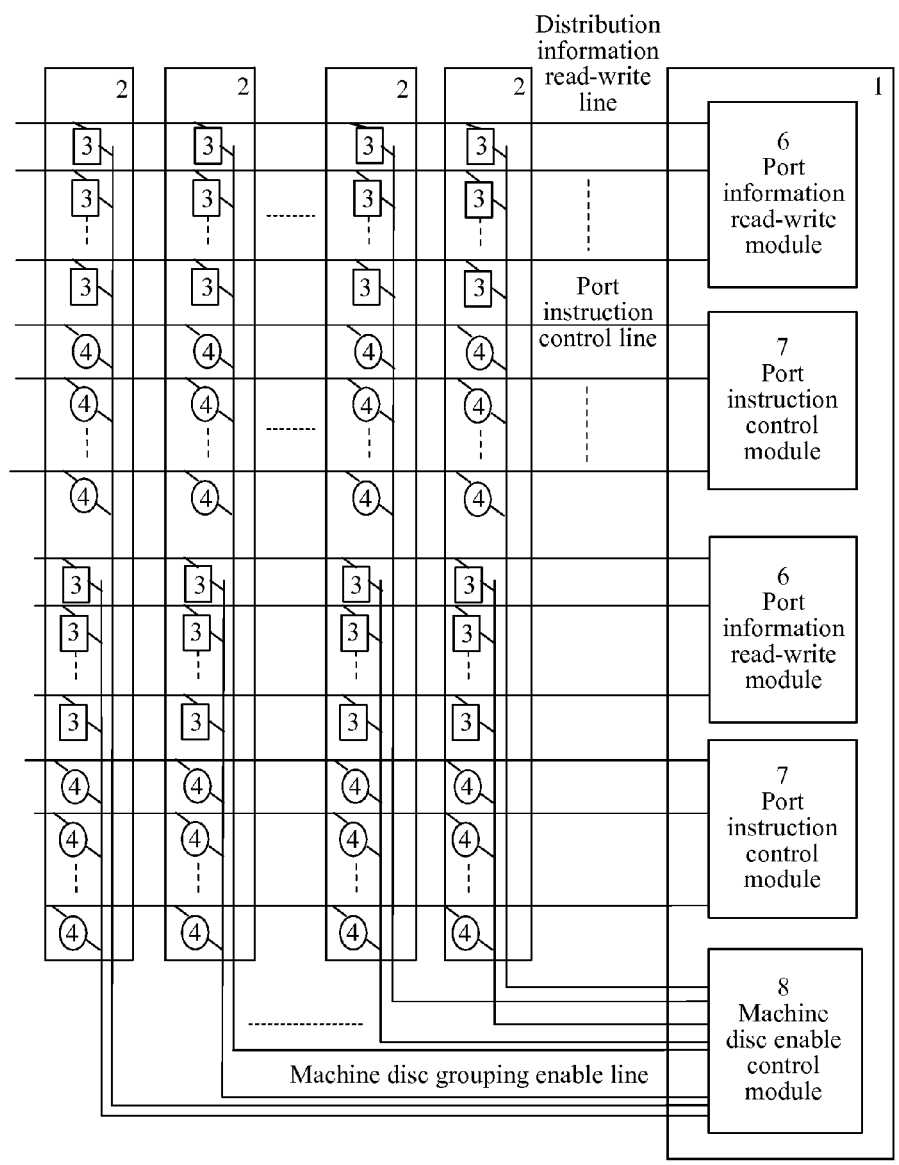
FIG. 6 is a circuit diagram according to embodiment 1.5 of the present invention.

Referring to FIG. 6, on a basis of the grouped port control manner in embodiment 1.1, the machine disc enable lines are grouped into several machine disc grouping enable lines whose functions are basically the same. In each passivated distribution interface disc 2, the distribution information read-write interface 3 whose port number is an odd number and the distribution port indicator 4 whose port number is the odd number match each other and are grouped into the same group. In each passivated distribution interface disc 2, the distribution information read-write interface 3 whose port number is an even odd number and the distribution port indicator 4 whose port number is the even number match each other and are grouped into the same group. The reference control ends of all the distribution information read-write interfaces 3 grouped into the same group and the reference management ends of all the distribution port indicators 4 grouped into the same group are connected, to form one machine disc grouping enable line corresponding to this group. All machine disc grouping enable lines are connected to the machine disc enable control module 8 in the intelligent distribution management disc 1.

Embodiment 1.6: Grouped Port Control+Grouped Machine Disc Enable (Evenly Divided into at Least Two Groups)

on a basis of the grouped port control manner in embodiment 1.1, the machine disc enable lines are grouped into several machine disc grouping enable lines (for a case where the machine disc enable lines are divided into two groups, refer to FIG. 6) whose functions are basically the same. All the distribution information read-write interfaces 3 and all the distribution port indicators 4 in each passivated distribution interface disc 2 are evenly divided into two groups are evenly divided into at least two groups respectively in an ascending order or a descending order of the port numbers. The distribution information read-write interfaces 3 and the distribution port indicators 4 with the same port number match each other and are grouped into the same group. The reference control ends of all the distribution information read-write interfaces 3 in each group and the reference management ends of all the distribution port indicators 4 in this group are connected, to form one machine disc grouping enable line corresponding to this group. All machine disc grouping enable lines are connected to the machine disc enable control module 8 in the intelligent distribution management disc 1.

Figure 7:
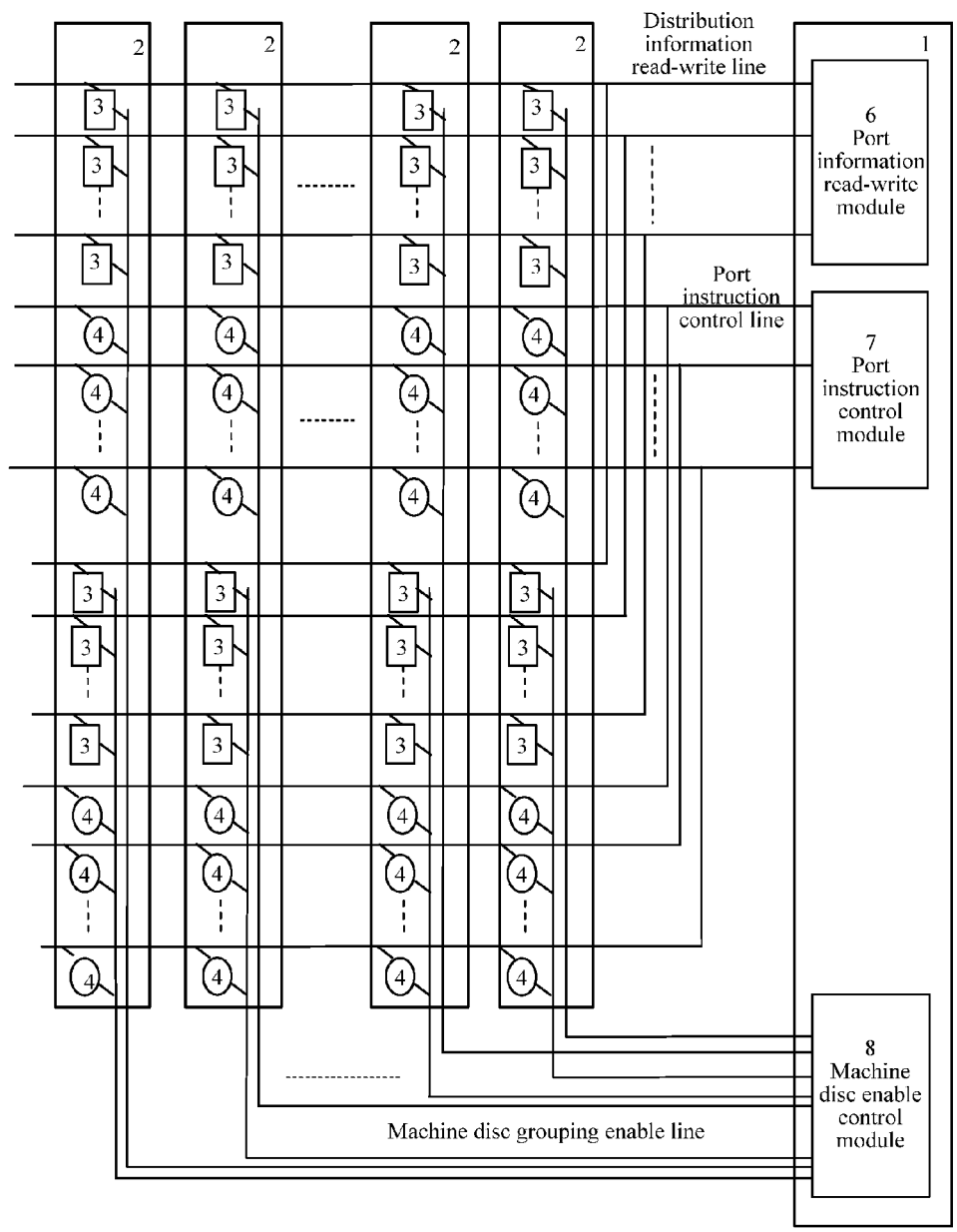
FIG. 7 is a circuit diagram according to embodiment 1.7 of the present invention.

Embodiment 1.7: Group Number+Grouped Machine Disc Enable (2 Groups for an Odd Number and an Even Number)+Combined Port Control Embodiment 1.8: Group Number+Grouped Machine Disc Enable (Evenly Divided into at Least 2 Groups)+Combined Port Control Embodiment 1.7 performs port combination and control on a basis of Embodiment 1.5. Referring to FIG. 7, Embodiment 1.8 performs the port combination and control on a basis of Embodiment 1.6. Specific connections of the port combination and control are as follows: the intelligent distribution management disc 1 includes a port information read-write module 6, a port instruction control module 7, and the machine disc enable control module 8. The port information read-write module 6 draws forth several distribution information read-write lines, and numbers the several distribution information read-write lines in sequence. The port instruction control module 7 draws forth several port instruction control lines, and numbers the several port instruction control lines in sequence. All the numbered distribution information read-write lines and all the numbered port instruction control lines jointly form a port read-write bus. After all the distribution information read-write interfaces 3 and all the distribution port indicators 4 in the passivated distribution interface discs 2 are grouped according to a certain rule, in all the groups in each passivated distribution interface disc 2, the ports are grouped and numbered in sequence again. Referring to FIG. 7, the signal read-write ends of all the distribution information read-write interfaces 3 with the same group number among all the groups in all the passivated distribution interface discs 2 are jointly connected in parallel to the distribution information read-write line that the port information read-write module 6 draws forth and is corresponding to this group number. The display control ends of all the distribution port indicators 4 with the same group number among all the groups in all the passivated distribution interface discs 2 are jointly connected in parallel to the port instruction control line that the port instruction control module 7 draws forth and is corresponding to this group number.

Embodiment 1.9: Combined Port Control+Grouped Machine Disc Enable (Respectively Connected to Form a Group)

Figure 8:
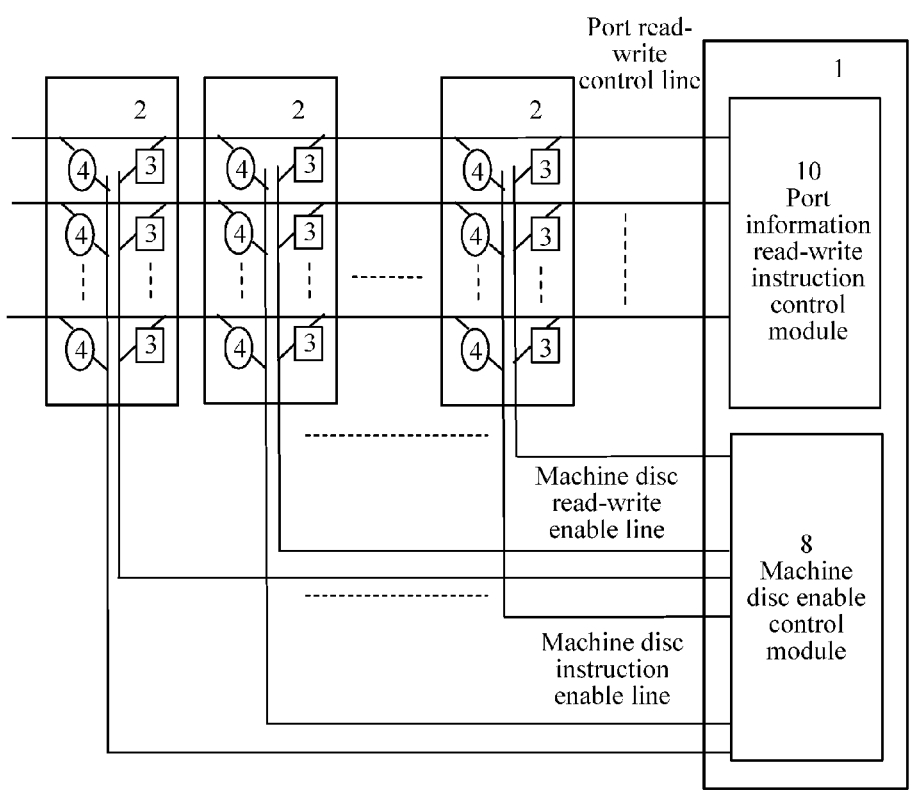
FIG. 8 is a circuit diagram according to embodiment 1.9 of the present invention.

Referring to FIG. 8, a basic circuit connection of a combined port control manner is as follows: an intelligent distribution management disc 1 includes a port information read-write instruction control module 10 and a machine disc enable control module 8, where the port information read-write instruction control module 10 is a CPLD, an FPGA, a read-write bus of a microprocessor and a software management logic device thereof, or an output bus of the microprocessor and a software management device thereof. The port information read-write instruction control module 10 draws forth several port read-write control lines. In all the passivated distribution interface discs 2, the signal read-write ends of the distribution information read-write interfaces 3 and the display control ends of the distribution port indicators 4 that have the same port number are jointly connected in parallel to the port read-write control line corresponding to the port number. All the port read-write control lines jointly form the port read-write bus. The port information read-write instruction control module 10 in the intelligent distribution management disc 1 performs port combination, control, and management on the distribution information read-write interfaces 3 and the distribution port indicators 4 in all the passivated distribution interface discs 2.

Figure 9:
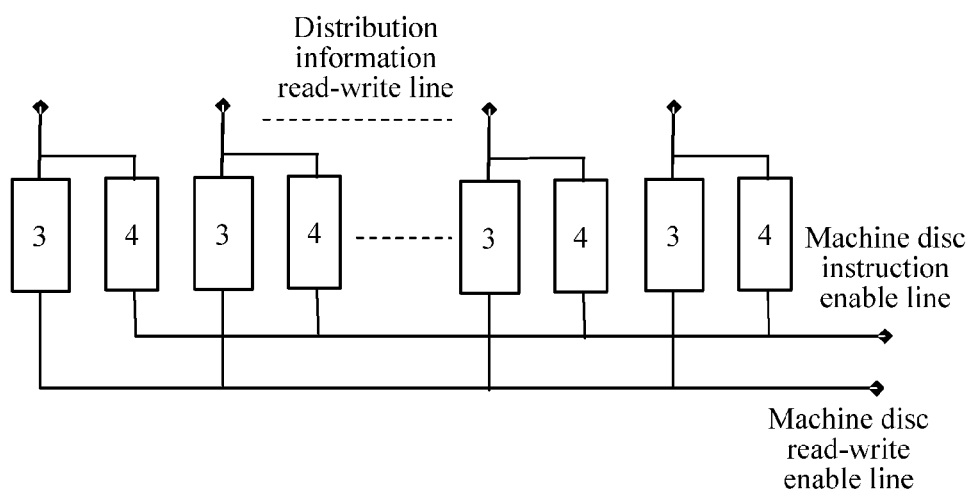
FIG. 9 is a circuit diagram inside a passivated distribution interface disc according to embodiment 1.9 of the present invention.

On a basis of the combined port control manner, the basic circuit connection of the grouped machine disc enable manner is as follows: referring to FIG. 9, the machine disc enable line is divided into a machine disc read-write enable line and a machine disc instruction enable line. The reference control ends of all the distribution information read-write interfaces 3 in passivated distribution interface discs 2 are connected as machine disc read-write enable lines of the passivated distribution interface discs 2. The reference management ends of all the distribution port indicators 4 are connected as machine disc instruction enable lines of the passivated distribution interface discs 2. The machine disc read-write enable lines and the machine disc instruction enable lines of all the passivated distribution interface discs 2 are connected to a machine disc enable control module 8 in the intelligent distribution management disc 1.

Embodiment 1.10: Combined Port Control+Grouped Machine Disc Enable (2 Groups Respectively for an Odd Number and an Even Number)

On a basis of the combined port control manner in embodiment 1.9, the machine disc enable line is divided into a machine disc read-write grouping enable line and a machine disc instruction grouping enable line. The distribution information read-write interfaces 3 in each passivated distribution interface disc 2 are divided into two groups according to parity of a port number. The distribution information read-write interfaces 3 whose port number is an odd number is grouped to form a group, and the distribution information read-write interfaces 3 whose port number is an even number is grouped to form another group. The reference control ends of the distribution information read-write interfaces 3 grouped into the same group are connected as a machine disc read-write grouping enable line of the distribution information read-write interfaces 3 of this group. The distribution port indicators 4 in all the passivated distribution interface discs 2 are divided into two groups according to parity of a port number. The distribution port indicators 4 whose port number is the odd number is grouped to form a group, and the distribution information read-write interfaces 3 whose port number is the even number is grouped to form another group. The reference control ends of the distribution port indicators 4 grouped into the same group are connected as a machine disc instruction grouping enable line of the distribution port indicators 4 of this group. All machine disc read-write grouping enable lines and machine disc instruction grouping enable lines are connected to the machine disc enable control module 8 in the intelligent distribution management disc 1.

Embodiment 1.11: Combined Port Control+Grouped Machine Disc Enable (Evenly Divided into at Least Two Groups Respectively)

On a basis of the combined port control manner in embodiment 1.9, the machine disc enable line is divided into a machine disc read-write grouping enable line and a machine disc instruction grouping enable line. The distribution information read-write interfaces 3 in each passivated distribution interface disc 2 are evenly divided into two or more groups in an ascending order or a descending order of the port numbers. The reference control ends of the distribution information read-write interfaces 3 grouped into the same group are connected as a machine disc read-write grouping enable line of the distribution information read-write interfaces 3 of this group. The distribution port indicators 4 in the passivated distribution interface discs 2 are evenly divided into two or more groups in the ascending order or the descending order of the port numbers. The reference management ends of the distribution port indicators 4 grouped into the same group are connected as the machine disc instruction grouping enable line of the distribution port indicators 4 of this group. All machine disc read-write grouping enable lines and machine disc instruction grouping enable lines are connected to the machine disc enable control module 8 in the intelligent distribution management disc 1.

The functions and names of the functions for the enable lines of the machine disc in Embodiments 1.1 to 1.11 are not the same, where the enable lines are the machine disc enable line in Embodiment 1.1, the machine disc read-write enable line and the machine disc instruction enable line in Embodiment 1.2 and 1.9, the machine disc read-write grouping enable line and the machine disc instruction grouping enable line in Embodiments 1.3 to 1.4 and 1.10 to 1.11, and the machine disc grouping enable line in Embodiments 1.5 to 1.8. To simplify description and for easier understanding, in the following, same content is not repeated, and only different points are emphasized.

The following, through 11 specific embodiments that are Embodiments 2.1 to 2.11, respectively describes superimposition of a circuit where a disc in-position instruction signal line is connected to an enable line of a machine disc on the 11 basic circuits in Embodiments 1.1 to 1.11.

Figure 10:
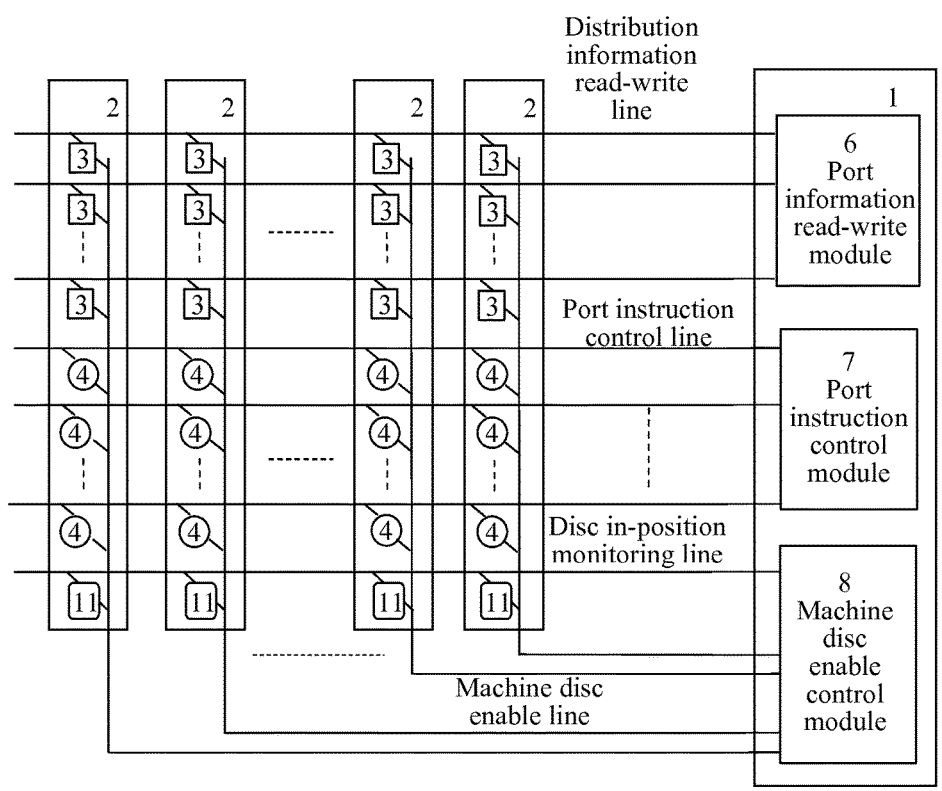
FIG. 10 is a circuit diagram according to embodiment 2.1 of the present invention.
Figure 11:
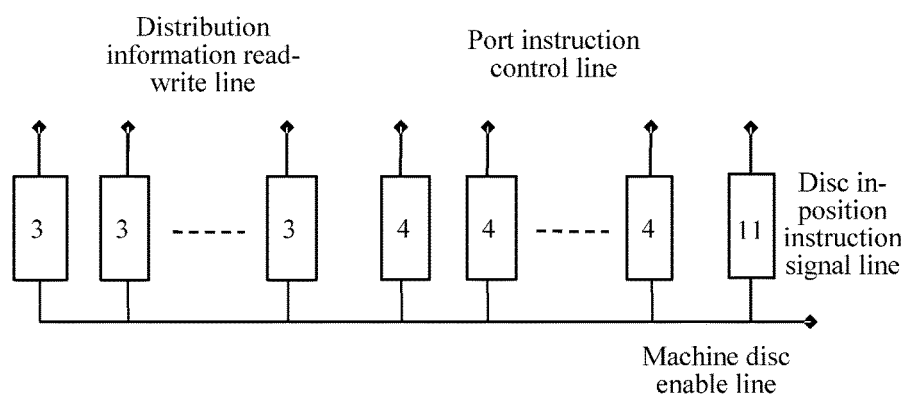
FIG. 11 is a circuit diagram inside a passivated distribution interface disc according to embodiment 2.1 of the present invention.
Figure 12:
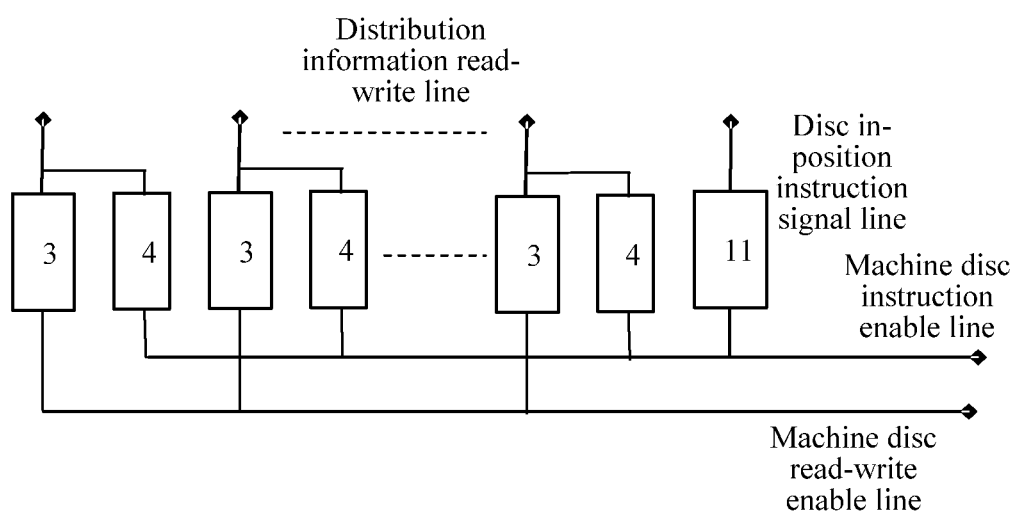
FIG. 12 is a circuit diagram inside a passivated distribution interface disc according to embodiment 2.9 of the present invention.

Embodiments 2.1 to 2.11 respectively add a disc in-position instruction function on a basis of Embodiments 1.1 to 1.11 in sequence, that is, add the disc in-position instruction signal line to connect to any enable line of the machine disc: a machine disc enable line, a machine disc read-write enable line, a machine disc instruction enable line, a machine disc grouping enable line, a machine disc read-write grouping enable line, and a machine disc instruction grouping enable line, and connection manners of the added lines are the same. Herein, the same connection manner of the added lines is emphasized: an intelligent distribution management disc 1 draws forth a disc in-position monitoring line; each passivated distribution interface disc 2 further includes a disc in-position instruction signal line; one end of the disc in-position instruction signal line is connected through an unidirectional level clamper 11 to any enable line (the machine disc enable line, machine disc read-write enable line, machine disc instruction enable line, machine disc grouping enable line, machine disc read-write grouping enable line, or machine disc instruction grouping enable line) of the passivated distribution interface discs 2 where the disc in-position instruction signal line, and the other end is connected to the disc in-position monitoring line that the intelligent distribution management disc 1 draws forth; the unidirectional level clamper 11 may be a diode or a unidirectional level clamper circuit. For an overall circuit connection in Embodiment 2.1, refer to FIG. 10. For a circuit connection inside the passivated distribution interface discs 2 in Embodiment 2.1, refer to FIG. 11. For the circuit connection inside the passivated distribution interface discs 2 in Embodiment 2.9, refer to FIG. 12.

The following, through 11 specific embodiments that are Embodiments 3.1 to 3.11, respectively describes superimposition of a circuit where a disc in-position instruction signal line is connected to a ground cable of a machine disc on the 11 basic circuits in Embodiments 1.1 to 1.11, to perform independent disc in-position monitoring.

Figure 13:
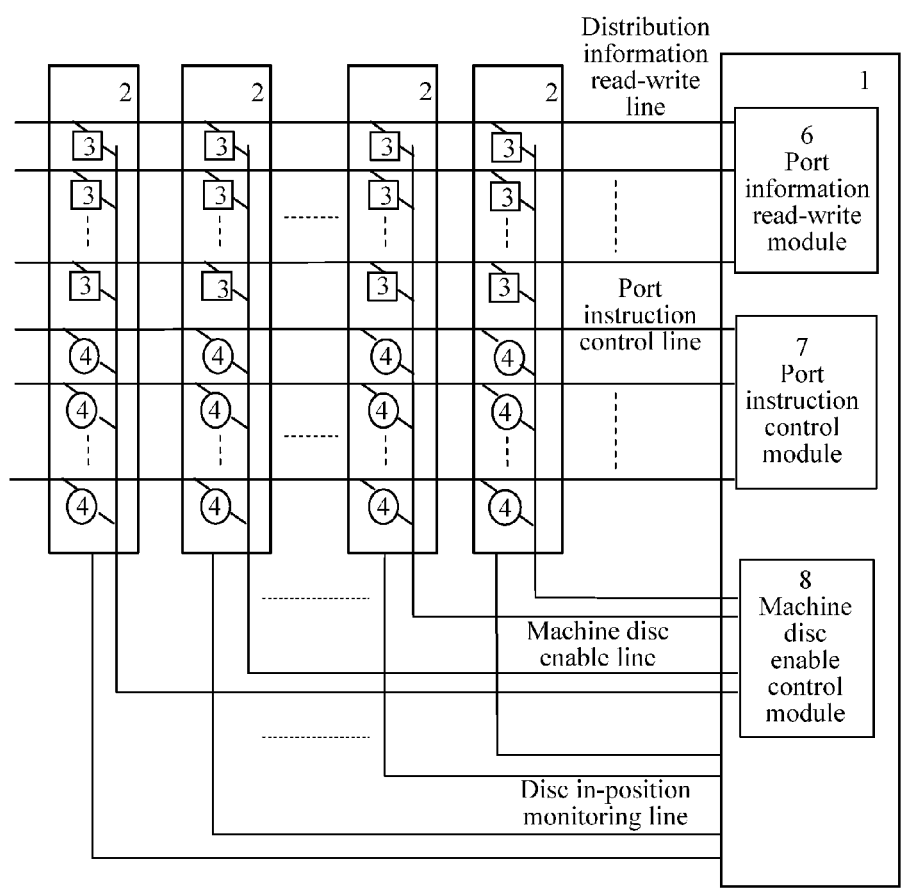
FIG. 13 is a circuit diagram according to embodiment 3.1 of the present invention.
Figure 14:
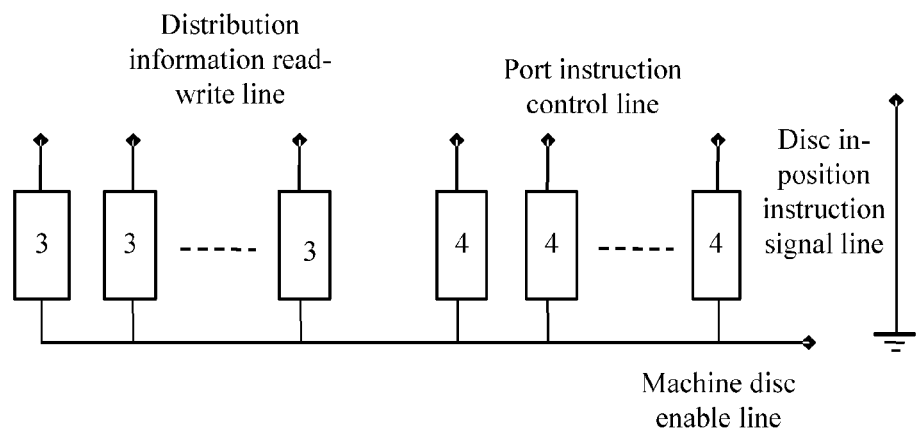
FIG. 14 is a circuit diagram inside a passivated distribution interface disc according to embodiment 3.1 of the present invention.
Figure 15:
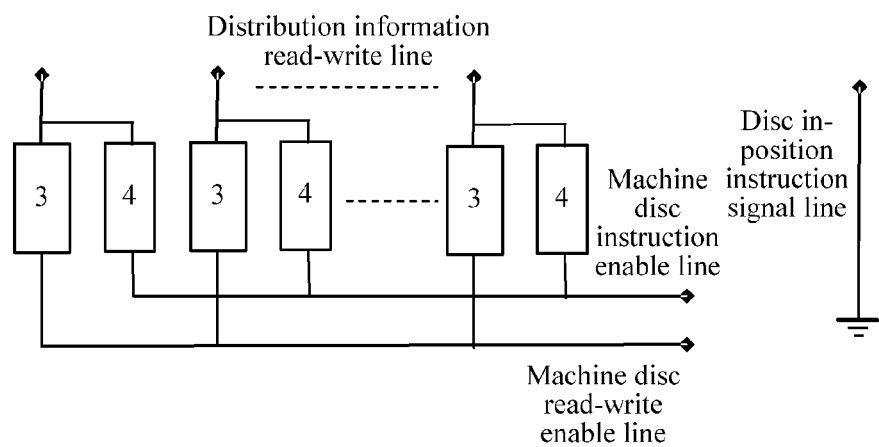
FIG. 15 is a circuit diagram inside a passivated distribution interface disc according to embodiment 3.9 of the present invention.

Embodiments 3.1 to 3.11 add a disc in-position instruction function on a basis of Embodiments 1.1 to 1.11 in sequence, that is, add the disc in-position instruction signal line to connect to the ground cable of the machine disc, and connection manners of the added lines are the same. Herein, the same connection manner of the added lines is emphasized: an intelligent distribution management disc 1 draws forth several disc in-position monitoring lines; a disc in-position instruction signal line is added to each passivated distribution interface disc 2; one end of the disc in-position instruction signal line is grounded, and the other end is respectively connected through a disc in-position monitoring line to a disc in-position monitoring end of the intelligent distribution management disc 1, to perform the independent disc in-position monitoring. For an overall circuit connection in Embodiment 3.1, refer to FIG. 13. For a circuit connection inside the passivated distribution interface discs 2 in Embodiment 3.1, refer to FIG. 14. For the circuit connection inside the passivated distribution interface discs 2 in Embodiment 3.9, refer to FIG. 15.

The following, through 11 specific embodiments that are Embodiments 4.1 to 4.11, respectively describes addition of a circuit of a disc type instruction function to the 11 basic circuits in Embodiments 1.1 to 1.11.

Figure 16:
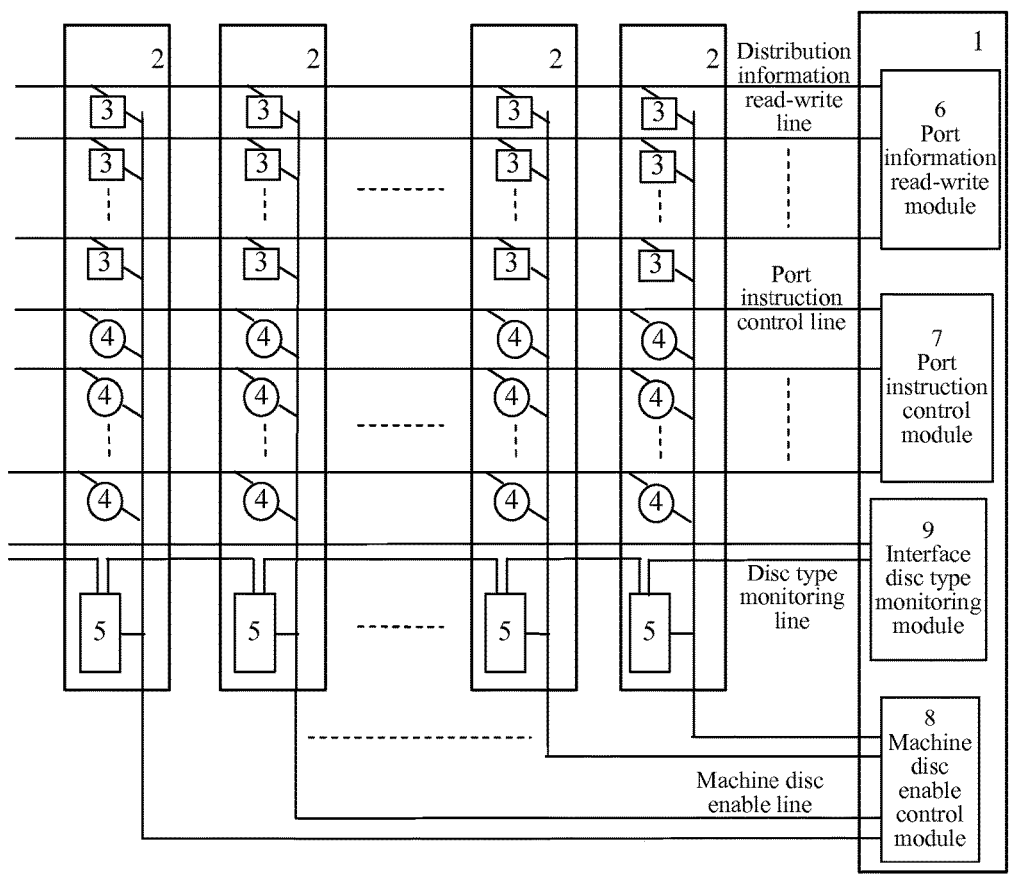
FIG. 16 is a circuit diagram according to embodiment 4.1 of the present invention.
Figure 17:
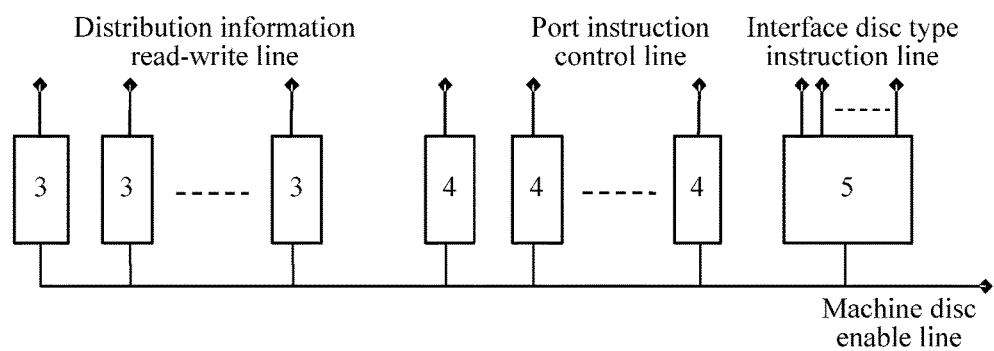
FIG. 17 is a circuit diagram inside a passivated distribution interface disc according to embodiment 4.1 of the present invention.
Figure 18:
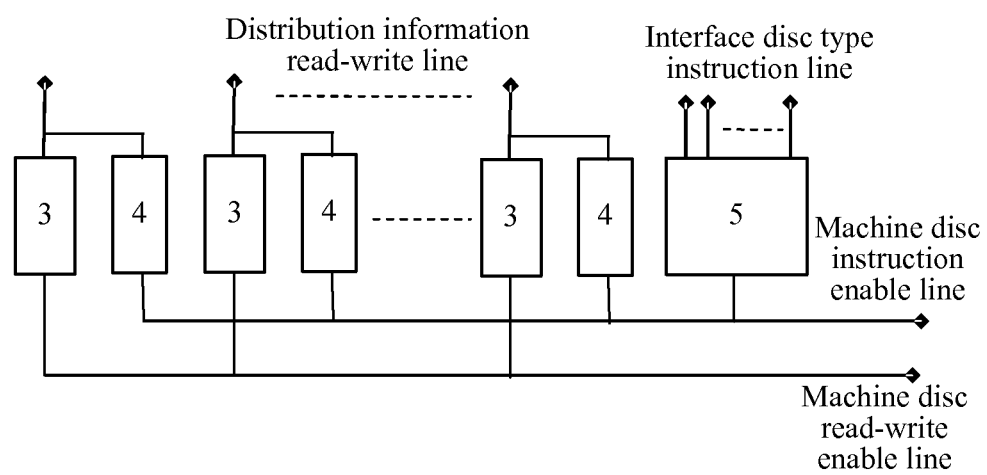
FIG. 18 is a circuit diagram inside a passivated distribution interface disc according to embodiment 4.9 of the present invention.
Figure 19:
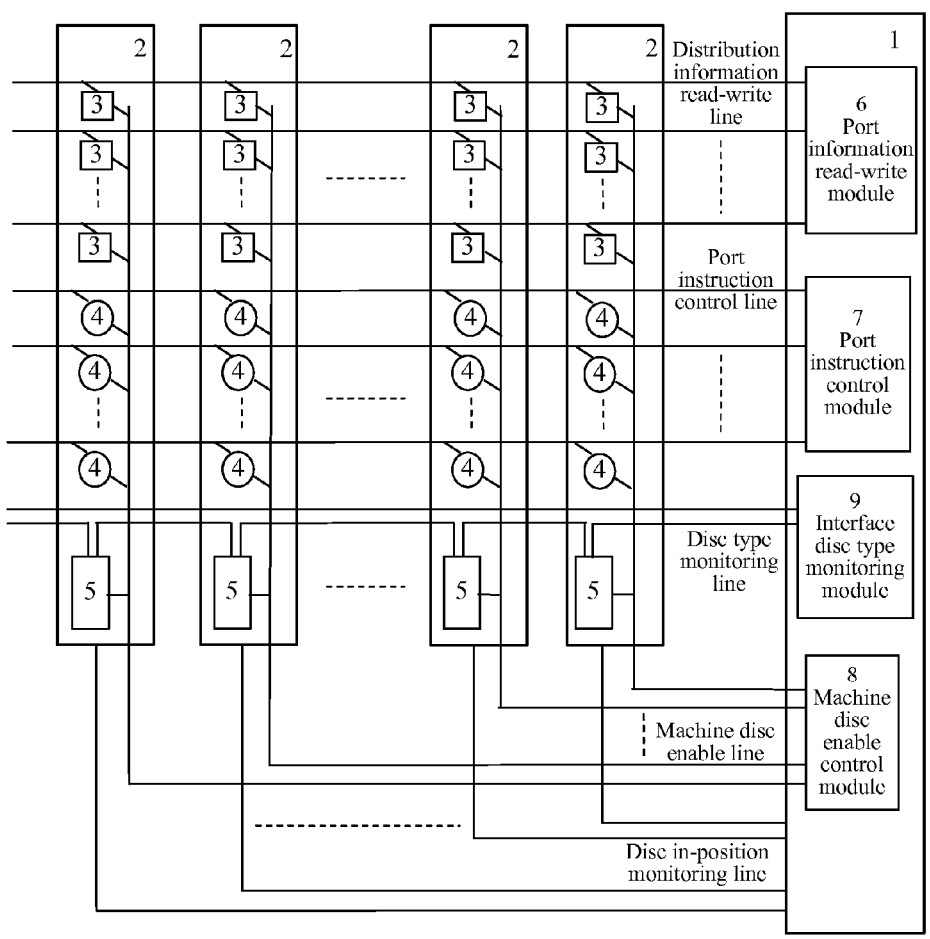
FIG. 19 is a circuit diagram according to embodiment 5.1 of the present invention.

Embodiments 4.1 to 4.11 add the disc type instruction function on a basis of Embodiments 1.1 to 1.11 in sequence, and connection manners of the added lines are the same. Herein, the same connection manner of the added lines is emphasized: an interface disc type monitoring module 9 is added to an intelligent distribution management disc 1; the interface disc type monitoring module 9 is a CPLD, an FPGA, or an input bus of a microprocessor and a software management logic thereof having or not having a disc in-position instruction function. A disc type encoder 5 and several interface disc type instruction lines are added to each passivated distribution interface disc 2. One ends of all the interface disc type instruction lines are connected through the disc type encoder 5 to any enable line (a machine disc enable line, a machine disc read-write enable line, a machine disc instruction enable line, a machine disc grouping enable line, a machine disc read-write grouping enable line, or a machine disc instruction grouping enable line) of the passivated distribution interface discs 2 where the interface disc type instruction line is located, and the other end is connected to the disc type instruction line corresponding to another passivated distribution interface disc 2 according to code position configuration for a code of the instruction line, to form a disc type monitoring line; the disc type monitoring line is connected to the interface disc type monitoring module 9. For an overall circuit connection in Embodiment 4.1, refer to FIG. 16. For a circuit connection inside the passivated distribution interface discs 2 in Embodiment 4.1, refer to FIG. 17. For the circuit connection inside the passivated distribution interface discs 2 in Embodiment 4.9, refer to FIG. 18.

The following, through 11 specific embodiments that are Embodiments 5.1 to 5.11, respectively describes addition of a circuit of a disc in-position instruction function and a disc type instruction function to the 11 basic circuits in Embodiments 1.1 to 1.11.

Embodiments 5.1 to 5.11 add the disc in-position instruction function and the disc type instruction function on a basis of Embodiments 1.1 to 1.11 in sequence, and connection manners of added lines are the same. Herein, the same connection manner of the added lines is emphasized: an intelligent distribution management disc 1 draws forth several disc in-position monitoring lines; a disc in-position instruction signal line is further added to each passivated distribution interface disc 2; one end of the disc in-position instruction signal line is grounded, and the other end is respectively connected through a disc in-position monitoring line that the intelligent distribution management disc 1 draws forth to a disc in-position monitoring end of the intelligent distribution management disc 1, to perform the independent disc in-position monitoring. An interface disc type monitoring module 9 is further added to the intelligent distribution management disc 1. The interface disc type monitoring module 9 is a CPLD, an FPGA, or an input bus of a microprocessor and a software management logic thereof not having a disc in-position instruction function. A disc type encoder 5 and several interface disc type instruction lines are further added to each passivated distribution interface disc 2. One ends of all the interface disc type instruction lines are connected through the disc type encoder 5 to any enable line (a machine disc enable line, a machine disc read-write enable line, a machine disc instruction enable line, a machine disc grouping enable line, a machine disc read-write grouping enable line, or a machine disc instruction grouping enable line) of the passivated distribution interface discs 2 where the interface disc type instruction line is located, and the other end is connected to the disc type instruction line corresponding to another passivated distribution interface disc 2 according to code position configuration for a code of the instruction line, to form a disc type monitoring line; the disc type monitoring line is connected to the interface disc type monitoring module 9. For an overall circuit connection in Embodiment 5.1, refer to FIG.

Figure 20:
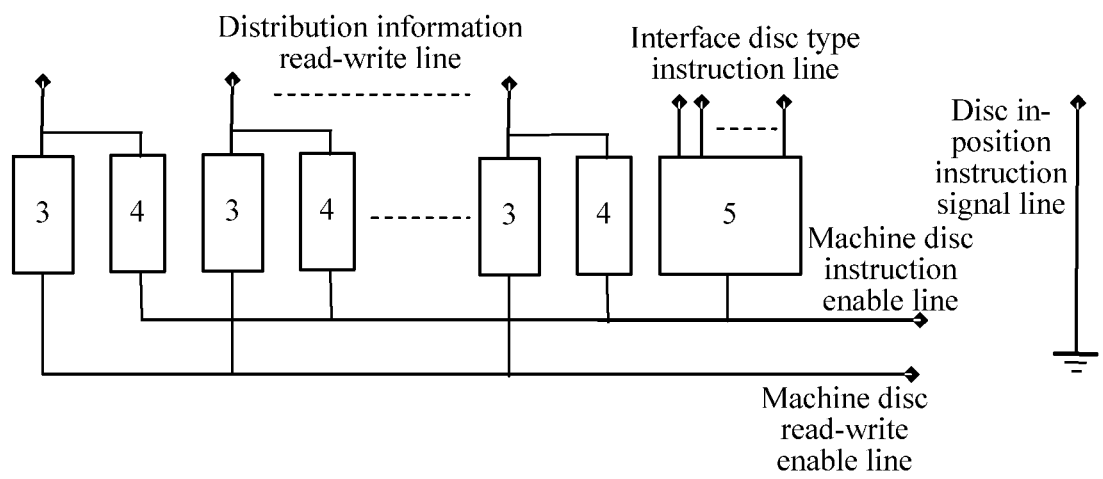
FIG. 20 is a circuit diagram inside a passivated distribution interface disc according to embodiment 5.9 of the present invention.

19. For a circuit connection inside the passivated distribution interface discs 2 in Embodiment 5.9, refer to FIG. 20.

The foregoing 55 embodiments are only examples for describing protection content of the present invention, and do not limit a protection scope of the present invention. Various changes and variations performed on specific grouping manners by a person skilled in the art are included in the protection scope of the present invention. Content not described in detail in this specification belongs to the prior art that is widely known by the person skilled in the art.

What we claim is:

1. A circuit for use in an optical network, comprising:
an intelligent distribution management disc (1);
a plurality of distribution interface discs (2), each of which is configured to receive a plurality of moveable optical connectors each containing a globally unique identity code;
a port read-write bus connecting the intelligent distribution management disc (1) and the plurality of distribution interface discs (2), and the port read-write bus including a plurality of distribution information read-write lines;
wherein each of the plurality of distribution interface discs (2) has a plurality of distribution information read-write interfaces (3) for respectively receiving a plurality of moveable optical connectors and respectively reading out respective globally unique identity codes stored in the movable optical connectors, each of the plurality of distribution information read-write interfaces (3) on a same distribution interface disc (2) is assigned a unique port number, a common set of unique numbers are used for each of the plurality of distribution interface discs (2), each of the plurality of distribution information read-write lines respectively connects corresponding distribution information read-write interfaces (3) having a same port number on each of the plurality of distribution interface discs (2) to the intelligent distribution management disc (1);
wherein the intelligent distribution management disc (1) has a plurality of machine disk enable lines for enabling the plurality of distribution interface disks (2) to perform read or write operations, each of the plurality of distribution interface discs (2) is connected to at least one corresponding machine disk enable line;
wherein each distribution information read-write interface (3) is located at an intersection between a specific machine disk enable line and a specific distribution information read-write line, allowing the intelligent distribution management disk to manage the plurality of distribution information read-write interfaces individually.

2. The circuit according to claim 1, wherein the intelligent distribution management disc (1) further includes a plurality of port instruction control lines, and each of the plurality of distribution interface discs (2) further includes a plurality of distribution port indicators (4), each of the plurality of distribution port indicators (4) on a same distribution interface disc (2) is assigned a unique indicator port number, a common set of unique indicator numbers are used for each of the plurality of distribution interface discs (2), each of the port instruction control lines respectively connects corresponding distribution port indicators (4) having a same indicator port number on each of the plurality of distribution interface discs (2) to intelligent distribution management disc (1).

3. The circuit according to claim 2, wherein the intelligent distribution management disc (1) includes a port information read-write module (6) connecting to the plurality of distribution information read-write lines (3), a port instruction control module (7) connecting to the plurality of port instruction control lines, and a machine disc enable control module (8) connecting to plurality of machine disk enable lines.

4. The circuit according to claim 3, wherein the plurality of distribution information read-write interfaces (3) and the plurality of port instruction control lines on each of the plurality of distribution interface discs (2) are connected to two machine disk enable lines, respectively.

5. The circuit according to claim 3, wherein the intelligent distribution management disc (1) further includes a plurality of disc in-position monitoring lines;

each distribution interface disc (2) further comprises a disc in-position instruction signal line; one end of the disc in-position instruction signal line is grounded, and the other end is connected through the disc in-position monitoring line to a disc in-position monitoring end corresponding to the intelligent distribution management disc (1), to perform independent disc in-position monitoring.

\* \* \* \* \*